United States Patent
Wu et al.

(10) Patent No.: US 7,180,651 B2
(45) Date of Patent: Feb. 20, 2007

(54) SPACER FABRICATION PROCESS FOR MANUFACTURING REFLECTIVE STEALTH MIRRORS AND OTHER MEMS DEVICES

(75) Inventors: Shan-Hua Wu, Hukou Township, Hsinchu County (TW); Fei-Yun Chen, Hinchu (TW); Wei-Ya Wang, Dalin Township, Chiayi County (TW); Hung-Hsin Liu, Hsinchu (TW); Sheng-Liang Pan, Hsin-Chu (TW)

(73) Assignee: Taiwan Semiconductor Manufacturing Co., Ltd., Taiwan (CN)

( * ) Notice: Subject to any disclaimer, the term of this patent is extended or adjusted under 35 U.S.C. 154(b) by 0 days.

(21) Appl. No.: 11/002,766

(22) Filed: Dec. 2, 2004

(65) Prior Publication Data
US 2006/0001945 A1 Jan. 5, 2006

Related U.S. Application Data

(60) Provisional application No. 60/584,738, filed on Jul. 1, 2004.

(51) Int. Cl.
*G02F 26/00* (2006.01)

(52) U.S. Cl. .................. 359/291; 359/292; 359/248

(58) Field of Classification Search ............... 359/291, 359/290, 292, 295, 298, 223, 224, 332, 245, 359/246, 248, 254; 438/642, 648, 649, 652, 438/655, 666, 667–669, 685, 687
See application file for complete search history.

(56) References Cited

U.S. PATENT DOCUMENTS

| | | | |
|---|---|---|---|
| 5,216,537 A | 6/1993 | Hornbeck | |
| 6,360,033 B1 * | 3/2002 | Lee et al. | ...................... 385/18 |
| 6,608,712 B2 * | 8/2003 | Michalicek | .................. 359/224 |

OTHER PUBLICATIONS

Peter F. Van Kessel et al., "A MEMS-Based Projection Display" IEEE Expert, Volumn 86, No. 8, Aug. 1998.*

* cited by examiner

*Primary Examiner*—Hung Xuan-Dang
*Assistant Examiner*—Tuyen Tra
(74) *Attorney, Agent, or Firm*—Duane Morris LLP

(57) ABSTRACT

A method for use in manufacturing a microelectromechanical system, such as a reflective stealth mirror includes the steps of: forming an I-shape mirror structure; forming a spacer layer over the I-shape mirror structure; and patterning the spacer layer to form at least one spacer along a side of the I-shape mirror structure.

26 Claims, 7 Drawing Sheets

SPACER FABRICATION PROCESS FOR MANUFACTURING REFLECTIVE STEALTH MIRRORS AND OTHER MEMS DEVICES

This application claims the benefit of U.S. Provisional Application No. 60/584,738, filed on Jul. 1, 2004.

FIELD OF THE INVENTION

The present invention relates to digital light processor systems and methods of fabricating such systems and, more particularly, to a spacer fabrication process for use in manufacturing reflective stealth mirrors and other microelectromechanical systems.

BACKGROUND

A digital light processor (DLP) is a microelectromechanical system (MEMS) that operates as a fast, reflective digital light switch. A DLP system combines image processing, a memory, a light source, and optics. The DLP may be monolithically fabricated in a complementary metal-oxide-semiconductor (CMOS) process over a conventional CMOS integrated circuit (IC).

A reflective stealth mirror (RSM) is a recent development in DLP systems. As illustrated in FIG. 1, an RSM may comprise one or more movable mirrors 20 and fixed hinges 30 to support the mirrors 20 on a glass substrate 10. Each mirror 20 reflects light in different directions depending on the state of an underlying memory cell.

Two layers of amorphous silicon (a-Si) are typically used during the fabrication of an RSM to fixedly support mirror 20 from the top and bottom. The a-Si layers are removed by etching to release mirror 20 after fabrication of the RSM is completed. Serious metal spiking often occurs at the interface of the mirror sidewalls and the overlying a-Si layer 40, which creates mirror bridges 45 after removal of the a-Si layer 40, as illustrated in FIG. 2. The spiking of the mirror is a major quality issue, as the resulting mirror bridges 45 prevent movement of the mirror 20 during operation of the RSM.

Oxide spacers may be utilized along the sidewalls of the mirror and the overlying a-Si layer to prevent spiking. As illustrated in FIG. 3A, the oxide spacers are conventionally fabricated by depositing a conformal oxide layer 60 over the mirror 20, formed by a bottom oxide layer 21, an intermediate reflective layer 22 and a top oxide layer 23, and anisotropically dry etching the oxide layer 60. If the spacer process is properly controlled, the oxide spacers 60a and 60b will have a height that allows them to completely cover each sidewall of the mirror 20, as illustrated in FIG. 3B. However, the height of the oxide spacers is hard to control using the conventional spacer process due to etching rate variations or unstable endpoint. Hence, the oxide layer 60 may be over-etched thereby resulting in spacers 60a', 60b' of insufficient height, which expose the intermediate reflective layer 22. The exposed portions of the reflective layer 22 are where the mirror bridges originate.

Accordingly, a robust spacer fabrication process is needed for manufacturing RSMs, and other MEMS devices, which avoids mirror bridging.

SUMMARY

An aspect of the invention is a method of fabricating spacers for use in manufacturing a microelectromechanical system, such as a reflective stealth mirror. The method comprises the steps of: forming an I-shape microelectromechanical structure, such as a mirror; forming a spacer layer over the microelectromechanical structure; and patterning the spacer layer to form at least one spacer along a side of the microelectromechanical structure.

Another aspect of the invention is a microelectromechanical system, such as a reflective stealth mirror. The microelectromechanical system comprises: a substrate; an I-shape microelectromechanical structure, such as a mirror, formed over the substrate; and at least one spacer disposed along a side of the microelectromechanical structure.

Still another aspect of the invention is a method of manufacturing a microelectromechanical system, such as a reflective stealth mirror. The method comprises the steps of: forming an I-shape microelectromechanical structure, such as a mirror; forming a spacer layer over the microelectromechanical structure; and patterning the spacer layer to form at least one spacer along a side of the microelectromechanical structure.

BRIEF DESCRIPTION OF THE DRAWINGS

FIGS. 4A–4E illustrate the fabrication of an I-shape mirror structure and FIGS. 5A and 5B illustrate the fabrication of spacers along sides of the I-shape mirror structure.

DETAILED DESCRIPTION

One aspect of the present invention is a spacer fabrication process for use in fabricating a RSM structure for DLP systems or other MEMS device. The process comprises fabricating a mirror structure having, in section, an I-shape and forming non-conductive spacers along the sides of the mirror structure. Another aspect of the present invention is a microelectromechanical system comprising a mirror structure having, in section, an I-shape. Still another aspect of the present invention is a method of manufacturing a microelectromechanical system.

Figure 1:
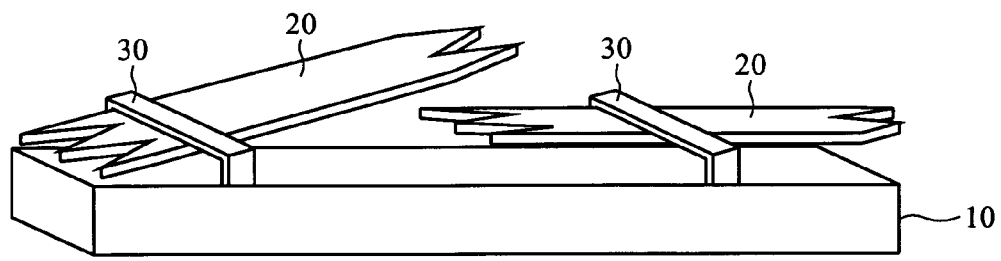
FIG. 1 is a perspective view of a conventional reflective stealth mirror.
Figure 2:
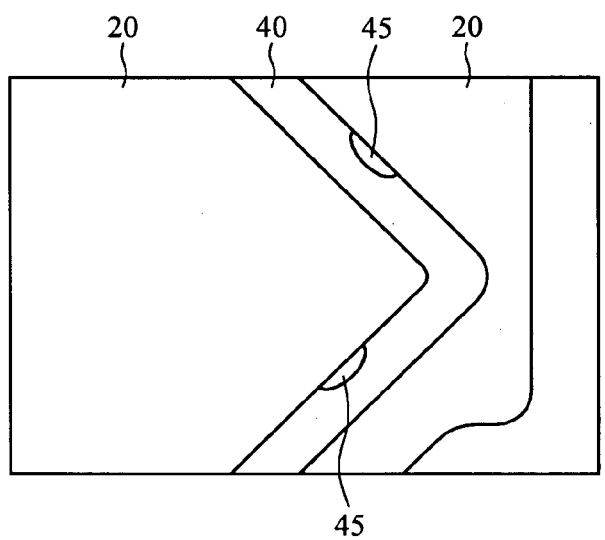
FIG. 2 is a top view of the mirror of during the manufacturing of a conventional reflective stealth mirror.
Figure 3A:
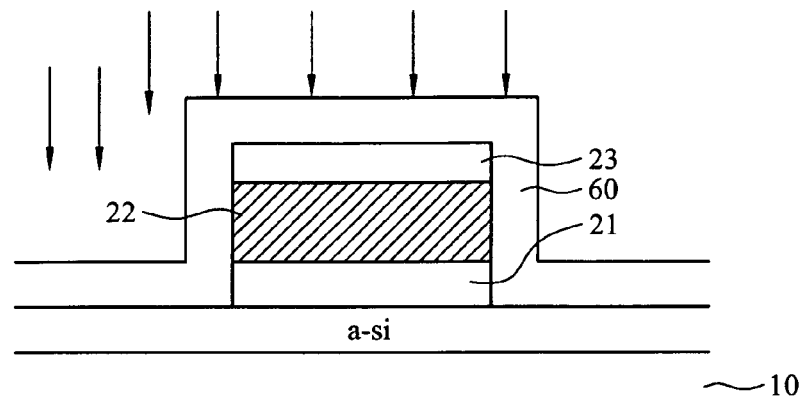
FIG. 3A is a sectional view through the mirror illustrating a conventional oxide spacer fabrication process.
Figure 3B:
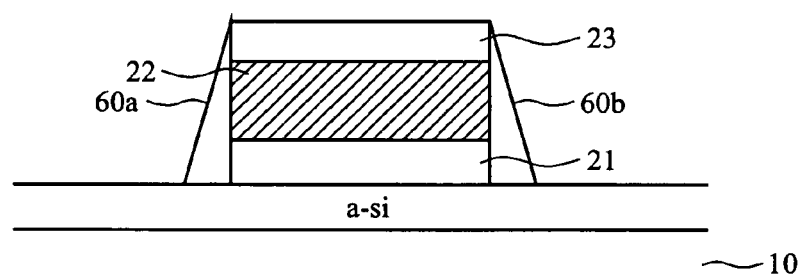
FIG. 3B is a sectional view through the mirror illustrating an ideal profile of oxide spacers fabricated according to the conventional oxide spacer process.
Figure 3C:
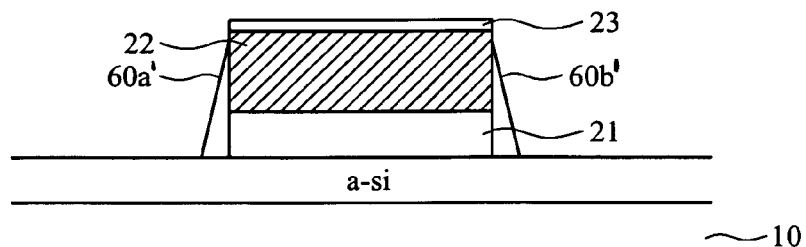
FIG. 3C is a sectional view through the mirror illustrating the profile of poorly constructed oxide spacers fabricated according to the conventional oxide spacer process.
Figure 4A:
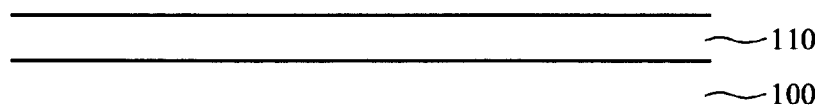
FIGS. 4A–4E, 5A, and 5B are sectional views through the mirror illustrating the spacer fabrication process of the present invention, where

Referring now to FIG. 4A, a first a-Si layer 110 is formed over a substrate 100. The substrate 100 is preferably composed of glass, however, the substrate 100 may be composed of other materials, such as silicon. The substrate 100 includes a CMOS IC (not shown) that will control the movement of the mirror structure to be formed thereon. The CMOS IC may be fabricated using conventional semiconductor wafer fabrication processes and materials. The first a-Si layer 110 may be formed using a conventional chemical vapor deposition (CVD) process. In one exemplary embodiment, the a-Si layer 110 may have a thickness of about 14,000 angstroms (A).

Figure 4B:
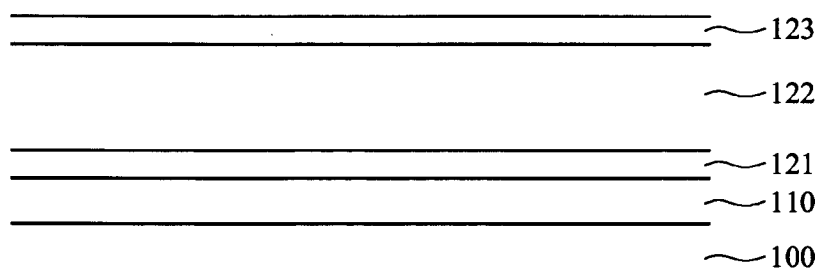

In FIG. 4B, a dielectric layer 121 is formed over the first a-Si layer 110. The dielectric layer 121 may be composed, for example, of silicon dioxide or silicon nitride and may be formed using a conventional CVD process. In one exemplary embodiment, the dielectric layer 121 may have a thickness of about 400 A.

As also illustrated in FIG. 4B, an intermediate reflective layer 122 composed, for example, of aluminum silicon copper (AlSiCu), is formed over the dielectric layer 121. The reflective layer 122 may be formed using a conventional CVD process, and in one exemplary embodiment, may have a thickness of about 2500 A.

As further illustrated in FIG. 4B, a barrier layer 123 composed, for example, of titanium nitride, is formed over the reflective layer 122. The barrier layer 123 may be formed using a conventional CVD process. In one exemplary embodiment, the barrier layer 123 may have a thickness of about 400 A so that it is transparent.

Figure 4C:
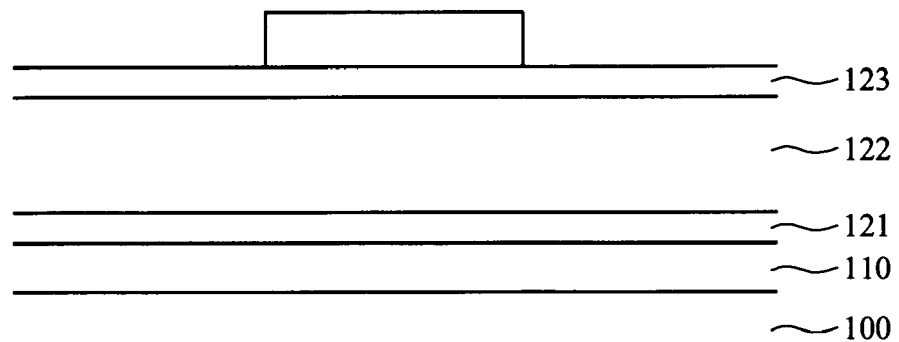

In FIG. 4C, a mask layer 140 (e.g., photoresist) is formed over a selected portion of the barrier layer 123. The mask layer 140 will be used during a first mirror patterning process to approximately define the mirror structure, as described immediately below.

Figure 4D:
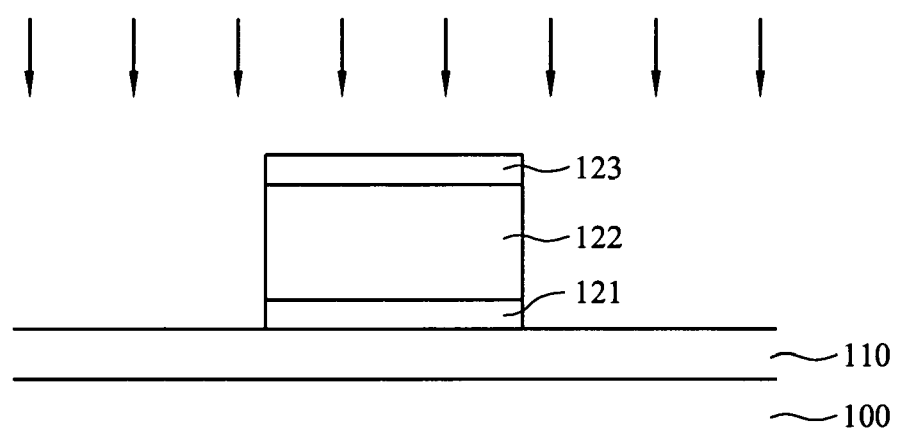

As illustrated in FIG. 4D, the barrier, reflective, and dielectric layers 123, 122, 121, are patterned to the approximate shape of the mirror structure using, for example, an anisotropic etching process.

Figure 4E:
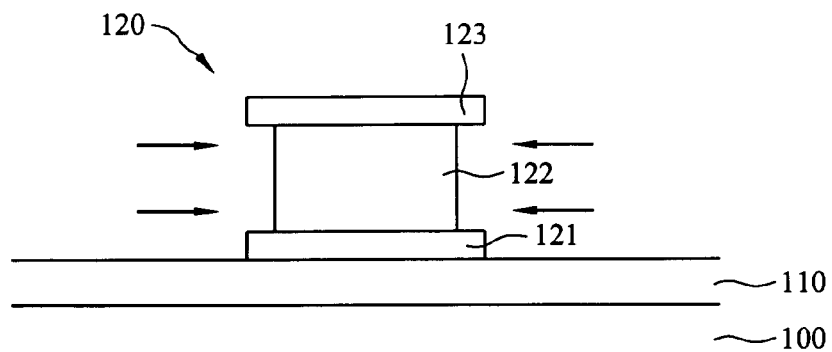

Then as illustrated in FIG. 4E, the mirror structure is further patterned so that the structure has an I-shape, in section. This may be accomplished, for example, using a dry isotropic etching process (that utilizes, e.g., a rich $Cl_2$ plasma) or a wet etching process. The isotropic dry or wet etch process is selective to the reflective layer 122 and etches this layer at a higher rate than the dielectric and barrier layers 123, 121. Accordingly, the dielectric and barrier layers 123, 121 overhang the reflective layer 122, thus creating a mirror structure 120 having an I-shape, in section.

Figure 5A:
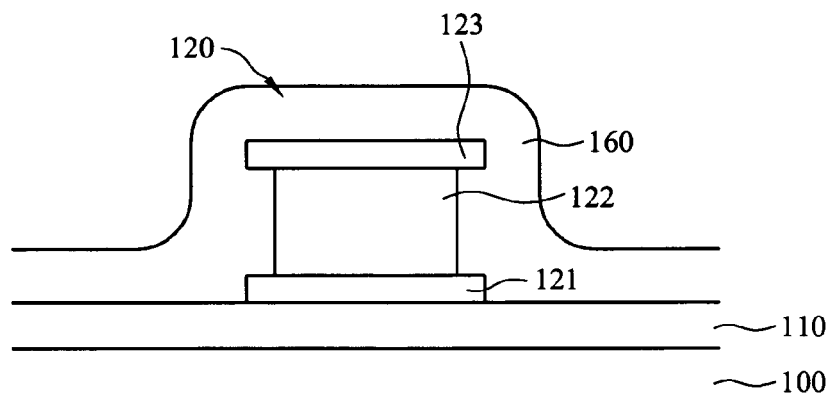
Figure 5B:
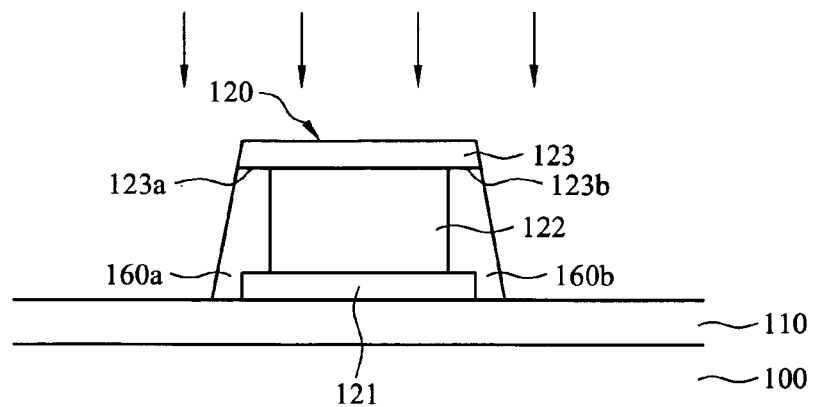

The non-conductive spacers are formed along the sides of the I-shape mirror structure as shown in FIGS. 5A and 5B. As illustrated in FIG. 5A, a spacer layer 160 is conformally formed over the I-shape mirror structure 120. The spacer layer 160 may be composed, for example, of plasma enhanced (PE) silicon dioxide or PE silicon nitride and may be formed using a conventional plasma enhanced chemical vapor deposition (PECVD) process. In one exemplary embodiment, the spacer layer 160 may be about 800 A in thickness.

As illustrated in FIG. 5B, the spacer layer 160 is patterned, using a conventional spacer etching process to form non-conductive spacers 160a, 160b that extend along the sides of the reflective and bottom dielectric layers 122, 121 of the mirror structure 120, between the overhanging barrier layer portions 123a, 123b and the substrate 100. The spacers 160a, 160b completely cover each sidewall of the reflective layer 122 of the mirror structure 120. The spacer layer 160 may be patterned with an anisotropic dry etching process that utilizes the barrier layer 123 of the I-shape mirror structure 120 as a hardmask.

Figure 6:
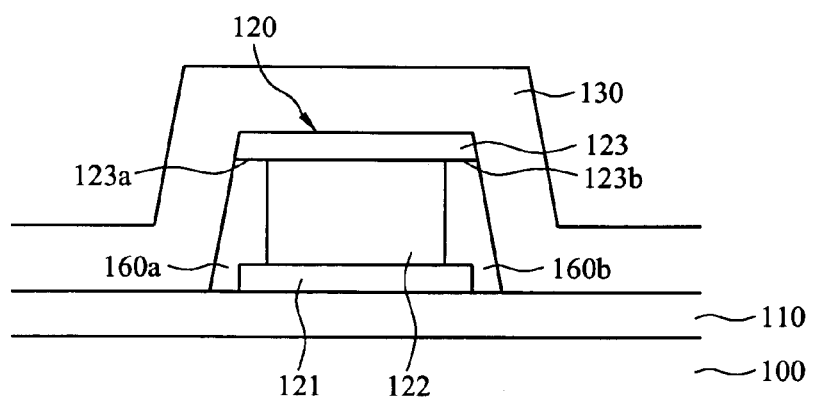
FIG. 6 is a sectional view through the completed I-shape mirror structure.

As illustrated in FIG. 6, a second a-Si layer 130 is formed over the mirror structure 120 and spacers 160a, 160b. The second a-Si layer 130 may be formed using a conventional CVD process and in one exemplary embodiment, may have a thickness of about 9000 A.

Figure 7:
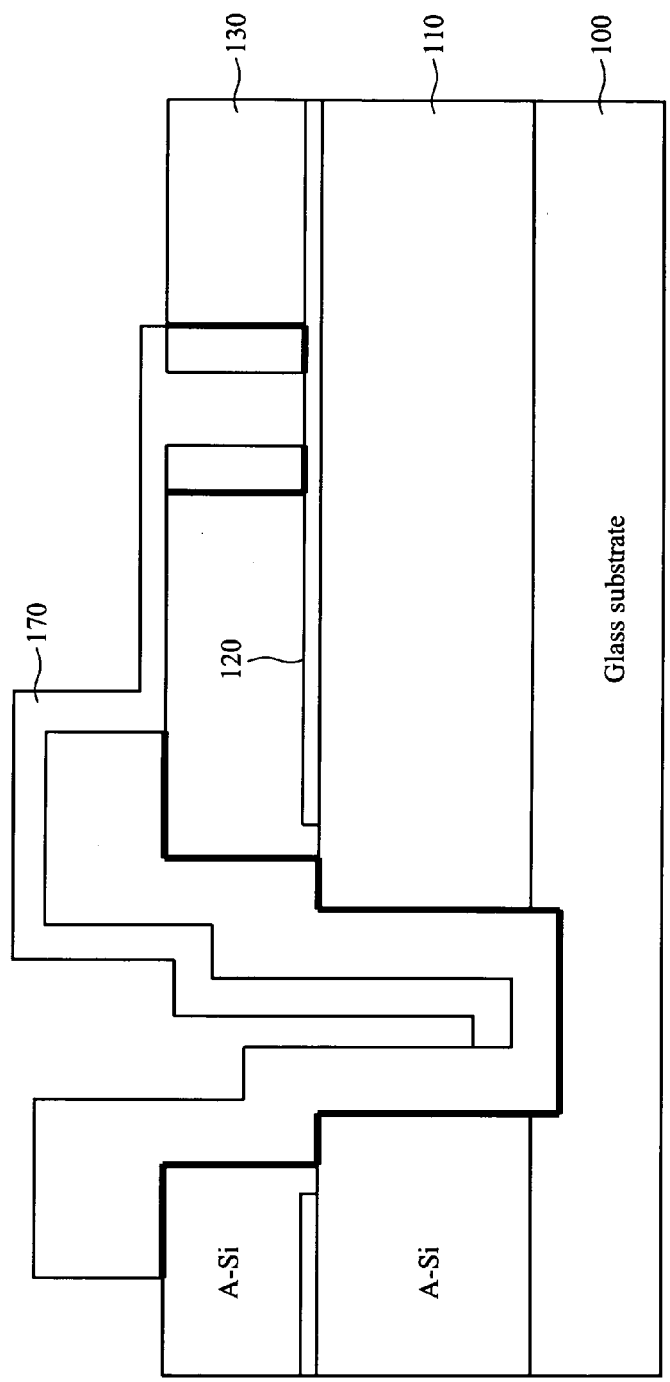
FIG. 7 is a sectional view through the I-shape mirror structure, after completion of an exemplary RSM.

FIG. 7 illustrates the I-shape mirror structure 120, after completion of the RSM. The first and second a-Si layers 110, 130 are subsequently removed to release the mirror structure 120 which is now coupled to the substrate 100 by a hinge 170, which may be fabricated using conventional MEMs methods. Because the spacers 160a, 160b, completely cover each sidewall of the reflective layer 122 of the mirror structure 120, (e.g. FIG. 6) there are no exposed portions of the reflective layer 122 where mirror bridges can originate due to spiking when the first and second a-Si layers 110, 130 are removed to release the mirror 120.

While the foregoing invention has been described with reference to the above, various modifications and changes can be made without departing from the spirit of the invention. Accordingly, all such modifications and changes are considered to be within the scope of the appended claims.

What is claimed is:

1. A method of fabricating spacers for use in manufacturing a mirror structure, the method comprising the steps of:
   forming a mirror structure having an I-shape;
   forming a spacer layer over the mirror structure; and
   patterning the spacer layer to form at least one spacer along a side of the mirror structure.

2. The method according to claim 1, wherein the mirror structure forming step comprises the steps of:
   forming a non-conductive layer over a substrate;
   forming a reflective layer over the non-conductive layer;
   forming a barrier layer over the reflective layer; and
   patterning the non-conductive, reflective, and barrier layers to approximately form the microelectromechanical structure.

3. The method according to claim 2, wherein the mirror structure forming step further comprises the step of isotropically etching the approximately formed mirror structure into the I-shape.

4. The method according to claim 3, wherein the isotropic etching step etches the reflective layer at a higher rate than the non-conductive and barrier layers.

5. The method according to claim 2, wherein the mirror structure forming step further comprises the step of selectively etching the reflective layer of the approximately formed micromechanical structure to form the micromechanical structure into the I-shape.

6. The method according to claim 1, wherein the patterning step is performed by an anisotropic etching process.

7. The method according to claim 1, wherein the mirror structure forming step is performed by an isotropic etching process.

8. The method according to claim 2, wherein the barrier layer operates as a hardmask during the spacer patterning step.

9. The method according to claim 1, wherein the mirror structure forms a component of a reflective stealth mirror.

10. A microelectromechanical system, comprising:
    a substrate;
    a mirror structure having, in section, an I-shape formed over the substrate; and
    at least one spacer disposed along a side of the mirror structure.

11. The system according to claim 10, wherein the mirror structure comprises:
    a non-conductive layer disposed over a substrate;
    a reflective layer disposed over the non-conductive layer; and
    a barrier layer disposed over the reflective layer.

12. The system according to claim 10, wherein the mirror system comprises a reflective stealth mirror.

13. A method of manufacturing a microelectromechanical system, the method comprising the steps of:
- forming a mirror structure having an I-shape;
- forming a spacer layer over the mirror structure; and
- patterning the spacer layer to form at least one spacer along a side of the mirror structure.

14. The method according to claim 13, wherein the mirror structure forming step comprises the steps of:
- forming a non-conductive layer over a substrate;
- forming a reflective layer over the non-conductive layer;
- forming a barrier layer over the reflective layer; and
- patterning the non-conductive, reflective, and barrier layers to approximately form the mirror structure.

15. The method according to claim 14, wherein the mirror structure forming step further comprises the step of isotropically etching the approximately formed micromechanical structure into the I-shape.

16. The method according to claim 15, wherein the isotropic etching step etches the reflective layer at a higher rate than the non-conductive and barrier layers.

17. The method according to claim 14, wherein the mirror structure forming step further comprises the step of selectively etching the reflective layer of the approximately formed mirror structure to form the mirror structure into the I-shape.

18. The method according to claim 14, wherein the barrier layer operates as a hardmask during the spacer patterning step.

19. The method according to claim 14, wherein the substrate includes a first mirror supporting layer.

20. The method according to claim 13, wherein the mirror structure forming step is performed by dry isotropic etching process.

21. The method according to claim 13, wherein the mirror structure forming step is performed by a wet etching process.

22. The method according to claim 13, wherein the mirror system comprises a reflective stealth mirror.

23. The method according to claim 13, wherein the mirror structure forming step comprises the steps of:
- providing a substrate;
- forming a first mirror structure supporting layer over the substrate;
- forming a non-conductive layer over the mirror structure supporting layer;
- forming a reflective layer over the non-conductive layer;
- forming a barrier layer over the reflective layer; and
- patterning the non-conductive, reflective, and barrier layers to approximately form the mirror structure.

24. The method according to claim 23, wherein the mirror structure forming step further comprises the step of isotropically etching the approximately formed micromechanical structure into the I-shape.

25. The method according to claim 24, further comprising the step of forming a second mirror structure supporting layer over the mirror structure and the at least one spacer.

26. The method according to claim 25, further comprising the steps of:
- forming a hinge that couples the mirror structure to the substrate; and
- removing the first and second mirror structure supporting layers.

* * * * *